(12) United States Patent
Raman et al.

(10) Patent No.: US 7,233,903 B2
(45) Date of Patent: Jun. 19, 2007

(54) SYSTEMS AND METHODS FOR MARKING AND LATER IDENTIFYING BARCODED ITEMS USING SPEECH

(75) Inventors: Thiruvilwamalai Venkatraman Raman, San Jose, CA (US); Jorge Campello de Souza, San Jose, CA (US); Bruce Alexander Wilson, San Jose, CA (US); Jeffrey Alan Kusnitz, Menlo Park, CA (US)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 09/817,475

(22) Filed: Mar. 26, 2001

(65) Prior Publication Data

US 2002/0138273 A1 Sep. 26, 2002

(51) Int. Cl.
*G10L 21/00* (2006.01)
(52) U.S. Cl. .......................................... 704/275; 704/3
(58) Field of Classification Search .................... 704/3, 704/270, 235, 275
See application file for complete search history.

(56) References Cited

U.S. PATENT DOCUMENTS

| | | | | |
|---|---|---|---|---|
| 4,624,012 A * | 11/1986 | Lin et al. | ..................... | 704/261 |
| 5,758,322 A * | 5/1998 | Rongley | ..................... | 704/275 |
| 5,852,803 A * | 12/1998 | Ashby et al. | ................ | 704/270 |
| 5,983,182 A * | 11/1999 | Moore | ......................... | 704/270 |
| 6,173,250 B1 * | 1/2001 | Jong | .............................. | 704/3 |
| 6,175,820 B1 * | 1/2001 | Dietz | ......................... | 704/235 |
| 6,366,886 B1 * | 4/2002 | Dragosh et al. | ......... | 704/270.1 |
| 6,453,281 B1 * | 9/2002 | Walters et al. | ............. | 704/200 |
| 6,487,534 B1 * | 11/2002 | Thelen et al. | ............... | 704/270 |
| 6,785,653 B1 * | 8/2004 | White et al. | ............. | 704/270.1 |
| 6,860,897 B2 * | 3/2005 | Bardy | ........................ | 600/301 |
| 6,868,385 B1 * | 3/2005 | Gerson | ...................... | 704/275 |
| 6,937,977 B2 * | 8/2005 | Gerson | ...................... | 704/201 |
| 6,941,264 B2 * | 9/2005 | Konopka et al. | ........... | 704/243 |
| 6,963,759 B1 * | 11/2005 | Gerson | ...................... | 455/563 |

OTHER PUBLICATIONS

New Products,Computer,vol. 17, Issue 12, Dec. 1984 pp. 88, AbstractPlus | Full Text: PDF(8464 KB) IEEE JNL☐☐.*

The PC goes ready-to-wear,Ditlea, S.; Spectrum, IEEE vol. 37, Issue 10, Oct. 2000 pp. 34-39, Digital Object Identifier 10.1109/6.873915.*

(Continued)

*Primary Examiner*—Michael N. Opsasnick
(74) *Attorney, Agent, or Firm*—Anne V. Dougherty; Ryan, Mason & Lewis, LLP

(57) ABSTRACT

Methods and/or systems/apparatus using speech for marking and subsequently identifying one or more items having electronically-readable identifiers respectively marked thereon comprise the following steps and/or perform the following operations. First, at least a portion of the electronically-readable identifier marked on an item is inputted. A user then inputs a spoken utterance that corresponds to the item. Next, the electronically-readable identifier inputted from the item is associated with the spoken utterance input from the user. Thus, when the electronically-readable identifier is inputted a next time, the spoken utterance associated with the electronically-readable identifier may be outputted. The present invention may also be embodied as an article of manufacture comprising a machine readable medium containing one or more programs which when executed implement the steps/operations of the invention.

18 Claims, 4 Drawing Sheets

OTHER PUBLICATIONS

"Voice Recognition Sytsmes"Artilces, Spec Sheet, and Data Sheet for SpeechMike Pro Scanner,individually labeled pp. 1-6, U.S. Philips.*

U.S. Appl. No. 09/460,961, filed Dec. 14, 1999, Comerford et al. "A Scalable Low Resource Dialog Manager".

U.S. Appl. No. 09/460,077, filed Dec. 14, 1999, Comerford et al. "Personal Speech Assistant".

U.S. Appl. No. 09/460,913, filed Dec. 14, 1999, Comerford et al. "Methods and Apparatus for Contingent Transfer and Execution of Spoken Language Interfaces".

U.S. Appl. No. 09/460,921, filed Dec. 14, 1999, Comerford et al. "Methods and Apparatus for Synchronizing Voice and Text Data in Accordance with Computing Devices".

* cited by examiner

SYSTEMS AND METHODS FOR MARKING AND LATER IDENTIFYING BARCODED ITEMS USING SPEECH

FIELD OF THE INVENTION

The present invention generally relates to techniques for assisting individuals with visual impairments and, more particularly, to techniques for allowing such individuals to mark and later identify items using speech.

BACKGROUND OF THE INVENTION

The task of identifying items that come in standard packaging, such as groceries or the like, is known to present difficulties to individuals who have visual impairments. While individuals without visual impairments may read all or a portion of a textual description posted on an item of interest, an inability to read (or, at least, a difficulty in reading) such a textual description makes it very hard for a visually impaired individual to discriminate between items that come in standard packaging. For example, it is difficult for a visually impaired individual to discriminate between a can of chicken soup and a can of vegetable soup, given that both cans may have similar tactile attributes (e.g., size, shape, weight, etc.), as well as similar audible attributes (e.g., the sound of shifting liquid).

One typical solution to this problem is to attach a Braille label to such an item such that the visually impaired individual can identify the item by translating the Braille label via touch. However, assuming one is properly trained to do so, translating a Braille label can be time consuming. Also, such an approach requires that all items that the visually impaired individual may seek to later identify be previously fitted with an appropriate Braille label. For grocery items that are in standard packaging, this is not always practical.

A device known as "Aloud" has been proposed for providing an individual with spoken dosage information for medicine contained in a prescription bottle to which it is attached. However, the device does not provide a way for the user to originally record a spoken description of his/her choice, nor does it provide a solution for use in marking and later identifying items having a wide variety of packaging types, particularly items that come in standard packaging like grocery items.

Thus, there is a need for techniques that allow visually impaired individuals to mark and later identify items which do not rely on Braille labels and which are more practical for use with items that come in standard packaging.

SUMMARY OF THE INVENTION

The present invention provides techniques that allow visually impaired individuals, and/or any other individuals, to mark and later identify items, wherein such techniques do not rely on Braille labels and which are more practical for use with items that come in standard packaging. More specifically, the present invention employs user input speech in accordance with electronically-readable identifiers marked on an item, such as a universal product code (UPC), to provide such advantageous techniques.

In one illustrative aspect of the invention, a method or system/apparatus using speech for marking and subsequently identifying one or more items having electronically-readable identifiers respectively marked thereon comprises the following steps (in the case of the method) or performs the following operations (in the cases of the system and apparatus). First, at least a portion of the electronically-readable identifier marked on an item is inputted. A user then inputs a spoken utterance that corresponds to the item. Next, the electronically-readable identifier inputted from the item is associated with the spoken utterance input from the user. Thus, when the electronically-readable identifier is inputted a next time, the spoken utterance associated with the electronically-readable identifier may be outputted. The present invention may also be embodied as an article of manufacture comprising a machine readable medium containing one or more programs which when executed implement the steps/operations of the invention.

Advantageously, in conjunction with the electronically-readable identifier, the user's spoken description of the item is used to mark the one or more items and then later identify them. Thus, for example, visually impaired individuals can mark their own grocery items with their own spoken description and later be able to listen to the spoken description in order to identify the grocery item. Of course, the original spoken description need not be provided by the same individual who later listens to it.

In terms of an example wherein the electronically-readable identifier marked on the item is a UPC that is readable by a barcode reader, the UPC on the item is first read (input) into the system. Then, the user inputs to the system a spoken utterance corresponding to some description of the item, e.g., if the item whose UPC has just been read is a can of chicken soup, the user may utter the phrase "can of chicken soup." The UPC then becomes associated with (e.g., stored with) the spoken utterance in the system. A stored database of UPCs with associated spoken descriptions may be created in this manner for a number of items. The UPCs may thus serve as indices for the spoken utterances. Then, after some time, when the user wishes to use the item but is not exactly sure that it is the correct item, the UPC on the item is read again by the system. The UPC is used to retrieve the associated spoken utterance and the spoken utterance is audibly output by the system to the user. Thus, the user can test different similarly packaged items and listen to the previously recorded spoken descriptions of them to find the desired item.

Advantageously, with the exception of a UPC which is ordinarily on most purchasable items, no other marking on an item is necessary to allow a visually impaired individual to mark and later identify the item.

In one embodiment, a system or apparatus of the invention may comprise a barcode reader for inputting UPCs from the items and a digital voice recorder for inputting, storing and outputting the spoken descriptions, indexed by the UPCs. In another embodiment, a system or apparatus of the invention may comprise a barcode reader for inputting UPCs from the items and a speech-enabled personal digital assistant (PDA) for inputting, storing and outputting the spoken descriptions, indexed by the UPCs. The dimensions of the system or apparatus depend on the functional components being employed, e.g., barcode reader, voice recorder, PDA. However, it is to be appreciated that the system or apparatus may be implemented in accordance with a user wearable computing device, such as a wristwatch computer.

In another illustrative aspect of the invention, the system or method may comprise converting the spoken utterances input by the user to text and associating the electronically-readable identifier input from the item with the corresponding text. This may be accomplished by a speech recognition system. Then, the text may be converted back to speech when the electronically-readable identifier associated with the spoken utterance is subsequently inputted so that the converted speech is outputted. This may be accomplished by a text-to-speech system.

In one embodiment, the speech-to-text conversion may be performed remotely from the item marking and identifying system. That is, the system may generate a UPC/spoken description association locally and then upload the association to a remotely located computer system. The computer system may implement a speech recognition engine that converts the speech to text. The text may then be downloaded to the item marking and identifying system and more optimally stored for future use. The remote computer system may archive the UPC/spoken description database and/or text for future use.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
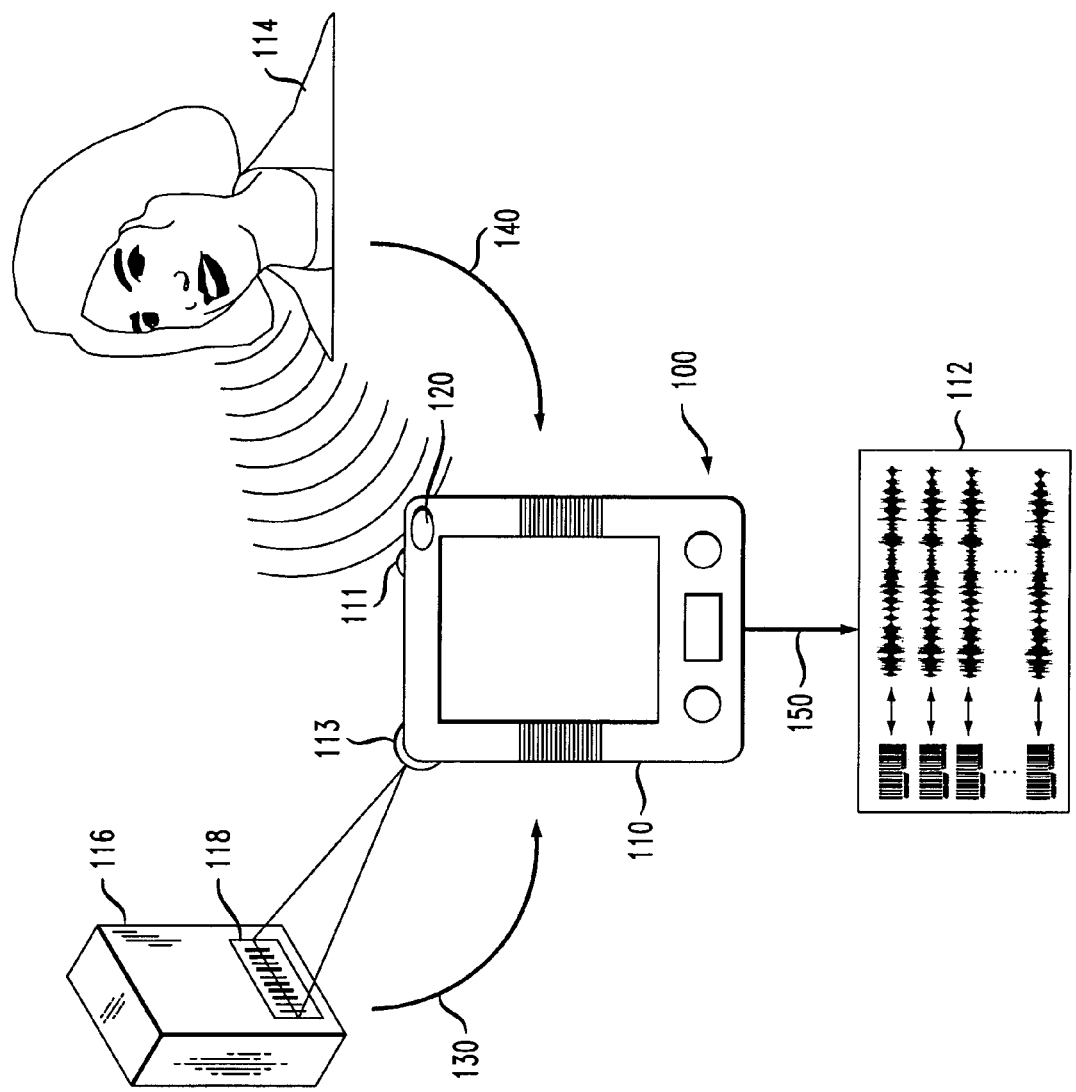
FIG. 1 is a block/flow diagram illustrating a speech-based item marking and identifying system according to an embodiment of the present invention and an illustrative environment in which it may be used.

The present invention will be explained below in the context of an illustrative speech-enabled personal digital assistant (PDA)/barcode reader embodiment. However, it is to be understood that the present invention is not limited to such a particular embodiment. Rather, the invention is more generally applicable for use in any architecture which permits associating identifying information marked on an item with a spoken description from a user corresponding to the item, such that the next time the particular identifying information is inputted, the spoken description is outputted.

Thus, in the illustrative embodiment described below, the present invention is configured as a speech-enabled PDA with a barcode reader built into the PDA housing. The speech-enabled PDA may comprise a "Personal Speech Assistant" or PSA as described in the patent applications identified as: U.S. Ser. No. 09/460,961, filed in the name of Comerford et al. on Dec. 14, 1999 and entitled "A Scalable Low Resource Dialog Manager;" U.S. Ser. No. 09/460,077, filed in the name of Comerford et al. on Dec. 14, 1999 and entitled "Personal Speech Assistant;" U.S. Ser. No. 09/460, 913, filed in the name of Comerford et al. on Dec. 14, 1999 and entitled "Methods and Apparatus for Contingent Transfer and Execution of Spoken Language Interfaces;" and U.S. Ser. No. 09/460,921, filed in the name of Comerford et al. on Dec. 14, 1999 and entitled "Methods and Apparatus for Synchronizing Voice and Text Data in Accordance with Computing Devices," the disclosures of which are incorporated herein by reference. In general, the PSA is a computing apparatus which provides a spoken language interface to another apparatus to which it is attached, e.g., a PDA, thus forming a speech-enabled PDA. In order to provide a spoken language interface, the PSA is designed to support execution of a conversational dialog manager and its supporting service engines. Such service engines may include, among others, a speech recognition engine and a text-to-speech engine.

However, as explained above, the teachings of the invention may be implemented in other speech-enabled PDAs or other speech-enabled computing devices. Also, in an alternative embodiment, the present invention may be configured as a digital voice recorder with a barcode reader built into the recorder housing.

Furthermore, the invention is not limited to use with a barcode reader and universal product codes (UPCs). While UPCs and barcode readers are readily available and convenient for an implementation for use with purchasable items like groceries, other electronically-readable information scanners may be used in accordance with the present invention. For example, the invention may employ an optical character recognition system, an electronic camera with object recognition, or any other suitable type of optical scanner.

So, as explained above, the invention may be implemented on any architectural platform that provides the ability to input identifying information marked on an item and to input, store and output spoken utterances, indexed by the identifying information. This may include, but is not limited to, wearable computing devices that may come in a variety of shapes and sizes, e.g., wristwatch-sized wearable computing devices, etc.

Referring now to FIG. 1, a block/flow diagram is shown illustrating a speech-based item marking and identifying system according to the present invention and an illustrative environment in which it may be used. As mentioned above, the illustrative embodiment of the speech-based item marking and identifying system 100 comprises a speech-enabled PDA 110 which preferably includes a spoken language interface such as the PSA in accordance with the above-referenced U.S. patent applications. The speech-enabled PDA 110 has a microphone 111 for capturing spoken utterances and memory 112 for storing spoken utterances in accordance with the invention. The memory 112 is illustrated outside of the speech-enabled PDA 110 for ease in illustrating the steps of the invention. However, the memory is preferably resident on the speech-enabled PDA 110. Nonetheless, as will be explained in the context of FIG. 4, the memory may be located on a computing device remote from the system 100. Also, as will be explained in the context of FIG. 3, the speech-enabled PDA comprises an audio output speaker 120. Furthermore, the system 100 comprises a barcode reader 113 housed in the speech-enabled PDA 110. An illustrative embodiment of system 100 will be explained below in the context of FIG. 5.

The system 100 is preferably configured to be hand-held such that it may be easily carried by a user 114. A speech-enabled PDA with a built-in barcode reader provides such portability. It is assumed that the user 114 has a visual impairment. The system 100 may be used to mark and later identify one or more items, such as item 116. Item 116 may be a grocery item that comes in a standard packaging, although this is not required. That is, the item may take on any form and be related to any application. The item 116 has a barcode 118, preferably in the form of a UPC, marked somewhere on its surface such that the barcode reader 113 of the system 100 can optically scan it. Given the above general description of the system and its operating environment, an illustrative method of its use will now be described.

First, as is depicted by operation arrow 130, the user 114 swipes barcode reader 113 of the hand-held system 100 over the UPC 118 on item 116. As is well-known in the art of barcode readers, the reader 113 optically scans the UPC on the item to determine the unique number encoded by the UPC. It is worth noting here that an assumption is made that each item scanned of a different type contains a unique UPC. Thus, for example, it is assumed that every can of chicken soup of one brand and size has the same UPC, while different items (whether it be the same item of a different brand or size, or an item of a different type altogether) have different UPCs. It is also assumed that either the user is: (i) aware of where the UPC is located on the item (e.g., UPCs may be located in pre-specified locations on similarly packaged items or distinguishable via touch on the surface of the item); (ii) told by someone where the UPC is located on the item; or (iii) after scanning the surfaces of the item in search of the UPC, given some audible confirmation from the system 100 that he/she has found and/or correctly scanned the UPC. The UPC may be temporarily stored.

Then, as depicted by operation arrow 140, the user 114 utters a spoken description of his/her choice of the item 116. It is assumed that the visually impaired user either previously knows what the item is or is assisted by someone who tells them what the item is. The spoken description may, for example, be an actual description of the item (e.g., "a can of chicken soup") or some other spoken utterance which, to the user, is intended to correspond to the item. The spoken utterance is captured by the microphone 111 and recorded by the speech-enabled PDA 110.

Next, as depicted by operation arrow 150, the spoken description is stored in a database in memory 112 indexed by the UPC 118 input by the barcode reader 113 from the item 116.

Figure 2:
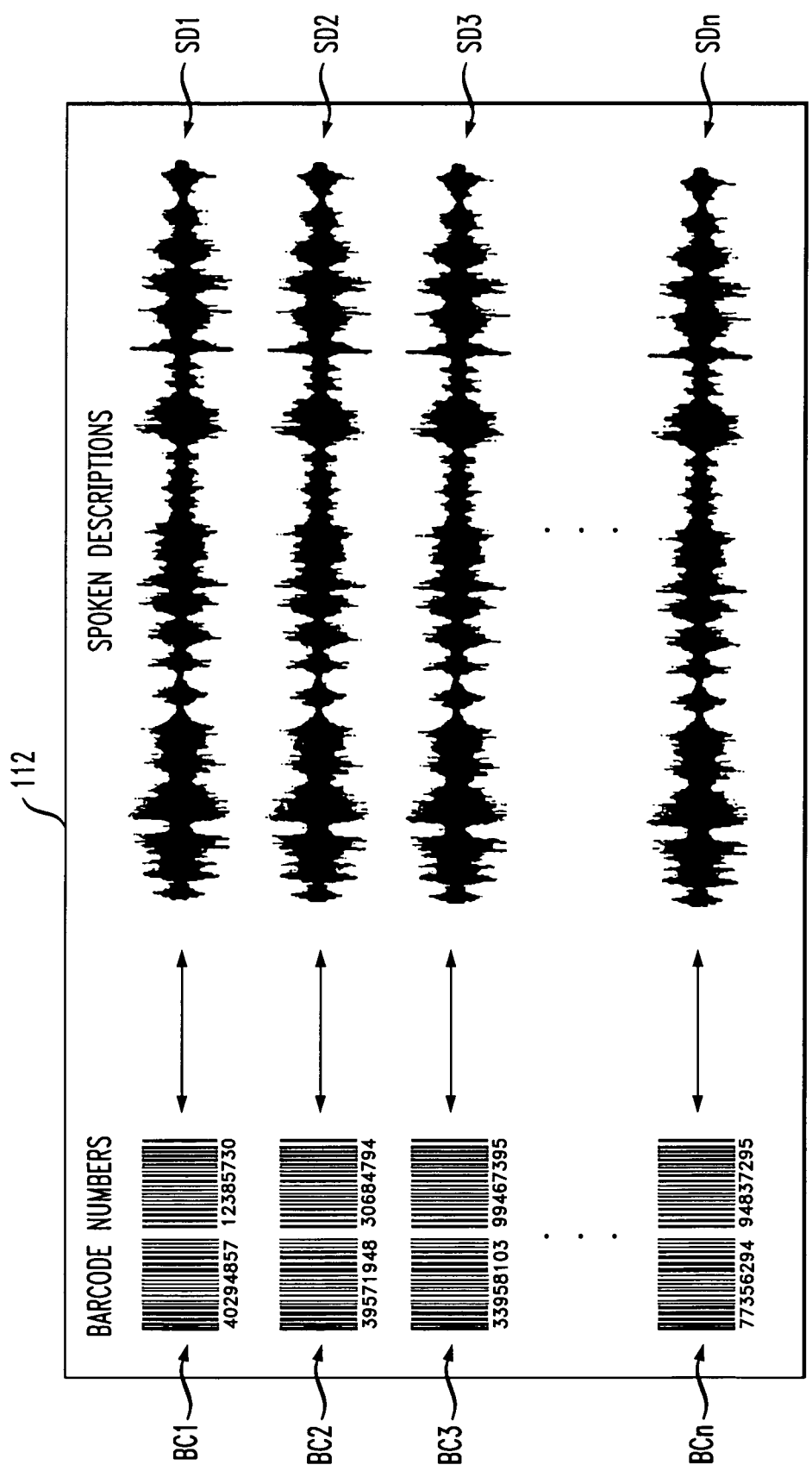
FIG. 2 is a diagram illustrating the content of a database created and stored in a memory of a speech-based item marking and identifying system according to an embodiment of the present invention.

FIG. 2 illustrates the content of the database that is created and stored in memory 112. As shown, an association is generated between each item's barcode that is scanned in by the barcode reader 113 and the spoken description offered by the user for each item. Thus, BC1 represents the barcode scanned by the system for a first item which is used as an index pointing to the memory location where the corresponding spoken description SD1 is stored. Thus, an association between the barcode BC1 and the spoken description SD1 is formed. This is repeated for each item scanned and marked with a spoken utterance by the user. As shown, barcode BC2 indexes spoken description SD2, and so on through the BCn/SDn association, where n is a number that is limited only by the memory capacity of the system. As will be explained in the context of FIG. 4, such a database of barcodes and spoken descriptions may be stored remotely from the system 100.

Figure 3:
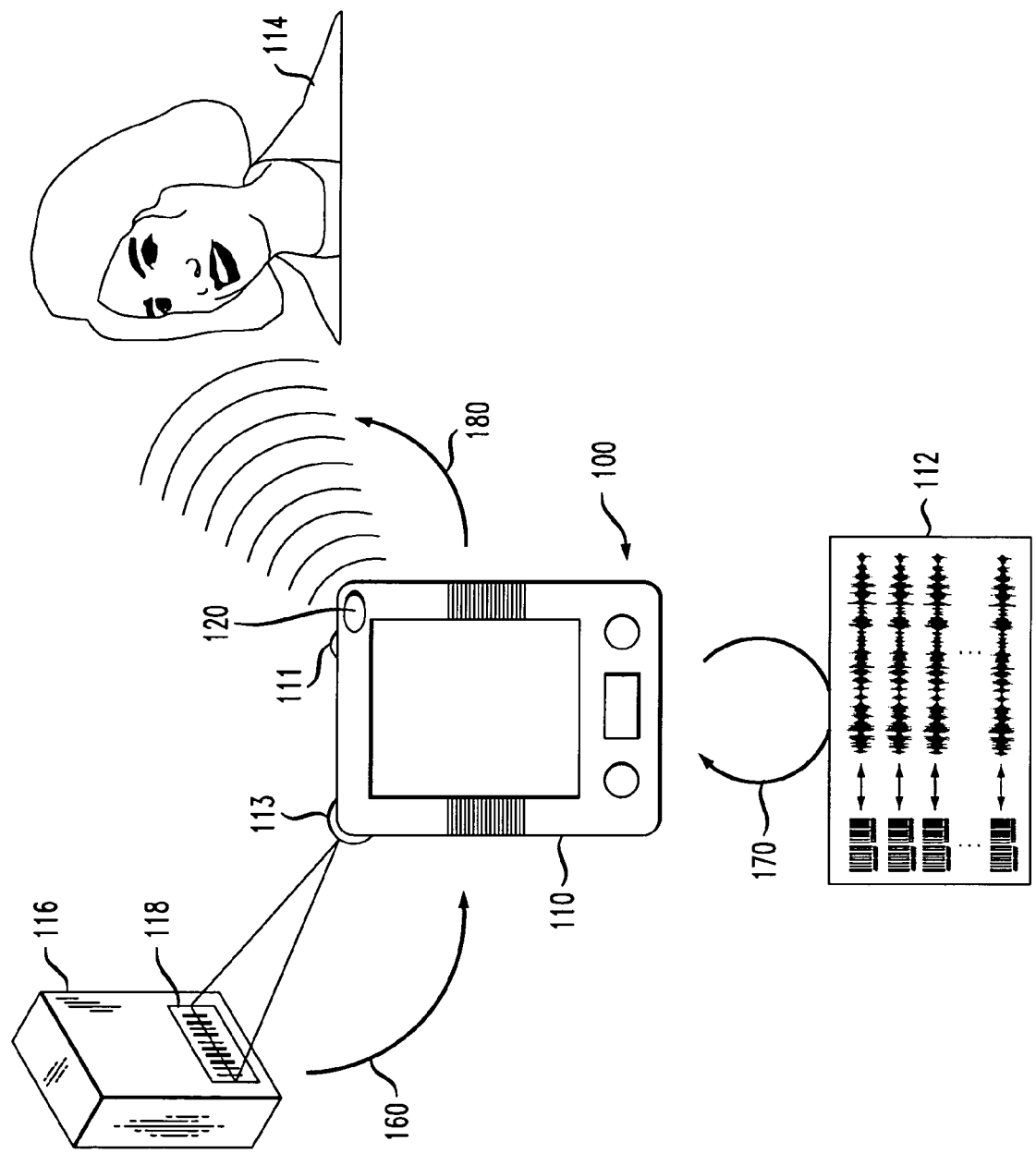
FIG. 3 is a block/flow diagram illustrating how the spoken data may be retrieved from a speech-based item marking and identifying system according to an embodiment of the present invention when the user is attempting to subsequently identify a previously speech-marked item.

Turning now to FIG. 3, a block/flow diagram is shown illustrating how the spoken data may be retrieved from the system 100 when the user is attempting to subsequently identify a previously speech-marked item.

First, as depicted by operation arrow 160, the user 114 again swipes the barcode reader 113 of the hand-held system 100 over the UPC 118 on item 116 so as to input the UPC. Next, as depicted by operation arrow 170, the speech-enabled PDA 110 takes the input barcode and searches the database for the memory location that the same UPC points to in the memory 112. Thus, assuming the item 116 is identified by BC1, the speech-enables PDA 110 retrieves spoken description SD1 and, as depicted by operation arrow 180, audibly outputs (plays back) the spoken utterance to the user 114. Advantageously, in this manner, the user 114 can identify the items he/she previously marked with speech.

The system 100 of the present invention may be augmented in several ways. For example, the recorded speech may be processed with an automatic speech recognizer (ASR) system to produce a searchable textual description. This can be done on the speech-enabled PDA 110. Alternatively, the speech-to-text conversion may be accomplished on a computing device remote from the speech-enabled PDA, as will be explained below in the context of FIG. 4, by uploading the database to the remote computing device. The results of converting speech to text can then be downloaded back to the speech-enabled PDA so that the information can be stored more optimally for future use. The speech-enabled PDA may have a text-to-speech system resident thereon for converting the stored text back to speech in order to output the corresponding spoken description when a matching UPC is again entered.

Advantageously, over time, the user's personal hand-held, speech-based marking and identifying system builds up a mapping between items that the user normally buys and their corresponding descriptions. This mapping can be used to advantage when buying the same item in the future, since the system can audibly output a previously-given description upon encountering the same item.

Figure 4:
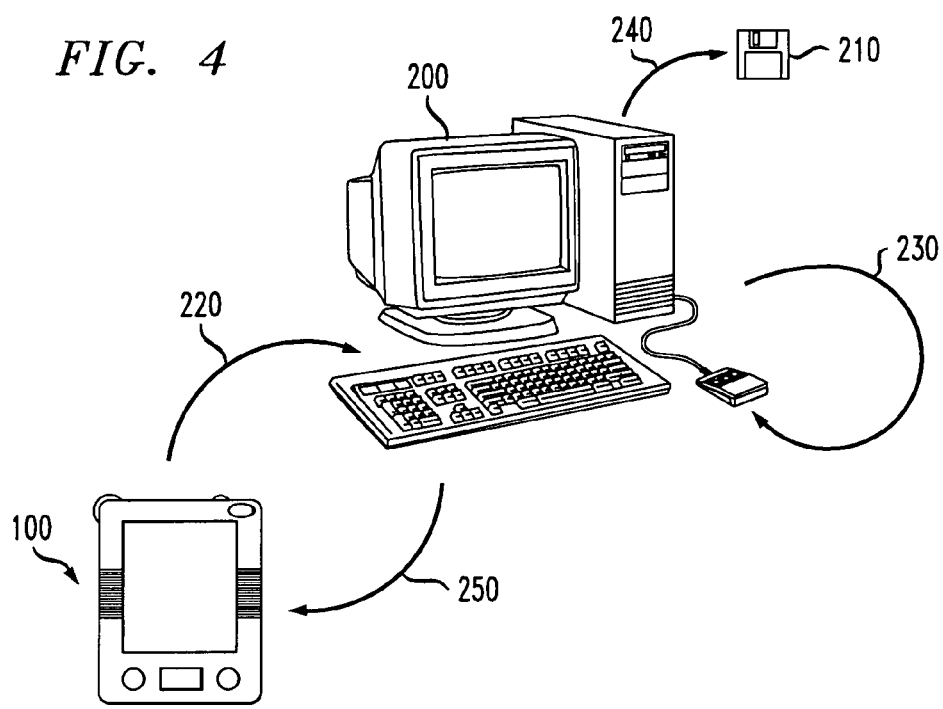
FIG. 4 is a block/flow diagram illustrating post-processing and archiving operations that may be employed in accordance with a speech-based item marking and identifying system according to an embodiment of the present invention.

Referring now to FIG. 4, a block/flow diagram illustrates post-processing and archiving operations that may be employed in accordance with a speech-based item marking and identifying system according to the present invention.

As shown, as depicted by operation arrow 220, the system 100 uploads the barcode/spoken description database (FIG. 2) it generated to a remotely located computing device 200. By way of example only, the computing device 200 may be a desktop personal computer. It could also be another speech-enabled PDA. The system 100 and the computing device 200 may be coupled in any manner, e.g., wired, wireless, public network, private network, etc.

It is assumed that the computing device 200 includes an ASR system. As such, as depicted by operation arrow 230, the ASR converts the uploaded spoken descriptions to text. The text is still preferably indexed by the corresponding UPC or barcode. Now with the text-converted spoken descriptions, the database can be archived on a removable storage medium 210 (e.g., floppy disc, CD-ROM, etc.), as depicted by operation arrow 240, and/or downloaded back to the system 100 for storage, as depicted by operation arrow 250.

It is to be appreciated that the use of speech recognition and text-to-speech systems may be implemented in real-time when the spoken utterances are first entered in the system (FIG. 1) and then output by the system (FIG. 3) or, as illustrated in the case of FIG. 4, implemented as post-processing operations.

Figure 5:
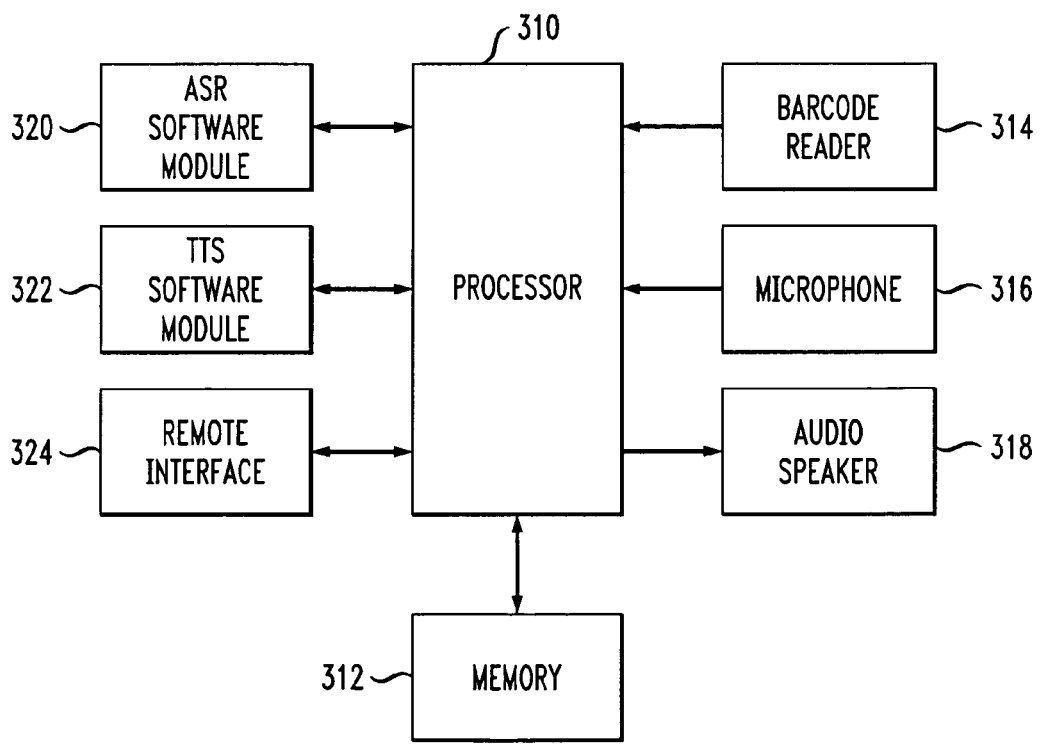
FIG. 5 is a block diagram illustrating a hardware implementation of a speech-based marking and identifying system according to an embodiment of the invention.

Referring now to FIG. 5, a block diagram is shown of an illustrative hardware implementation of a speech-based marking and identifying system according to an embodiment of the invention. In this particular implementation, the system comprises: a processor 310; and operatively coupled thereto, a memory 312, a barcode reader 314, a microphone 316, an audio speaker 318, automatic speech recognition (ASR) software 320, text-to-speech (TTS) software 322, and a remote interface 324.

The processor 310 controls and/or performs the various operations associated with the illustrative system of the invention depicted in FIGS. 1–4. It is to be appreciated that the term "processor" as used herein is intended to include any processing device, such as, for example, one that includes a CPU (central processing unit) and/or other processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. The memory 312 may correspond to the database memory 112 illustrated in FIG. 2.

As has been explained above in detail, the barcode reader 314 serves to input the UPCs from the scanned items. The microphone 316 captures the spoken descriptions uttered by the user. The audio speaker 318 audibly outputs the spoken descriptions to the user once retrieved via the item's UPC. In an embodiment where the spoken descriptions are to be converted to text and from text back to speech, the processor may execute the ASR module 320 and the TTS module 322, respectively. The remote interface 324 serves as a communication interface to a remote computing device, such as device 200 in FIG. 4.

Accordingly, computer software (one or more programs) including instructions or code for performing the methodologies of the invention, as described herein, may be stored in one or more of the associated memory devices denoted by memory 312 (e.g., ROM, fixed or removable memory) and, when ready to be utilized, loaded in part or in whole (e.g., into RAM) and executed by processor 310. In any case, it should be understood that the elements illustrated in FIG. 5 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of using speech for marking and subsequently identifying one or more items having electronically-readable identifiers respectively marked thereon, the method comprising the steps of:

inputting at least a portion of the electronically-readable identifier marked on an item;
   inputting from a user a spoken utterance that corresponds to the item;
   converting the spoken utterance input by the user to text;
   associating the electronically-readable identifier input from the item with at least one of the spoken utterance input from the user and the corresponding text; and
   outputting the spoken utterance when the electronically-readable identifier associated with the spoken utterance is subsequently inputted;
   wherein the speech-to-text conversion is performed on a computing device remotely located with respect to a computing system performing the other steps, and further wherein the computing device that performs the speech-to-text conversion archives electronically-readable identifiers and associated text-converted spoken utterances on a removable storage medium such that an archived mapping is created over time between items having electronically-readable identifiers and text-converted spoken utterances that are representative of user descriptions of the items wherein the archived mapping is specific to the user and is removably-portable and represents items that the user may interact with at a future time or place, and further wherein the spoken utterance input by the user is transmitted to the remotely-located computing device prior to speech-to-text conversion.

2. The method of claim 1, wherein the step of converting the spoken utterance to text is performed by a speech recognition system.

3. The method of claim 1, further comprising the steps of, when the electronically-readable identifier input from the item is associated with the corresponding text, converting the text back to speech when the electronically-readable identifier is subsequently inputted and then outputting the converted speech.

4. The method of claim 3, wherein the step of converting the text back to speech is performed by a text-to-speech system.

5. The method of claim 1, wherein the electronically-readable identifier marked on the item is a universal product code.

6. The method of claim 5, wherein the electronically-readable identifier inputting step comprises reading the universal product code from each item with a barcode reader.

7. The method of claim 6, wherein the associating step comprises storing the spoken utterance corresponding to each item using the universal product code read by the barcode reader for each item as an index.

8. The method of claim 7, wherein the outputting step comprises:

subsequently reading the universal product code from an item with the barcode reader;
   searching stored spoken utterances using the universal product code as an index; and
   playing back the spoken utterance that is found in the search to the user.

9. A system for using speech for marking and subsequently identifying one or more items having electronically-readable identifiers respectively marked thereon, the system comprising:

a first input device, the first input device being operative to input at least a portion of the electronically-readable identifier marked on an item;
   a second input device, the second input device being operative to input a spoken utterance from a user that corresponds to the item;
   a storage mechanism, the storage mechanism being operatively coupled to the first and second input devices and operative to associate the electronically-readable identifier input from the item with the spoken utterance input from the user;

a remotely-located speech recognition system for: (i) uploading from the storage mechanism the association of the electronically-readable identifier input from the item and the spoken utterance input from the user; (ii) converting the spoken utterance to text, wherein the corresponding text is archived on a removable storage medium such that an archived mapping is created over time between items having electronically-readable identifiers and text-converted spoken utterances that are representative of user descriptions of the items wherein the archived mapping is specific to the user and is removably-portable and represents items that the user may interact with at a future time or place; and (iii) downloading to the storage mechanism the corresponding text;

a text-to-speech system operatively coupled to the storage mechanism and operative to convert the corresponding text back to speech when the electronically-readable identifier associated with the spoken utterance is subsequently re-inputted; and an output device, the output device being operatively coupled to the text-to-speech system and operative to output the converted speech.

10. The system of claim 9, further comprising a computing device for remotely archiving the electronically-readable identifier/spoken utterance association.

11. The system of claim 9, wherein the electronically-readable identifier marked on the one or more items is a universal product code.

12. The system of claim 11, wherein the first input device is a barcode reader which reads the universal product code from each item.

13. The system of claim 12, wherein the storage mechanism is operative to store the spoken utterance corresponding to each item using the universal product code read by the barcode reader for each item as an index.

14. The system of claim 13, wherein the output device is operative to play back to the user the spoken utterance that is found during a search by the storage mechanism using a universal product code as an index when the universal product code is subsequently read from an item by the barcode reader.

15. Apparatus for using speech for marking and subsequently identifying one or more items having barcodes respectively marked thereon, the apparatus comprising:
a barcode reader, the barcode reader being operative to input at least a portion of a barcode marked on an item;
a speech capturing device, the speech capturing device being operative to input a spoken utterance from a user that corresponds to an item;
processing means being operatively coupled to the barcode reader and the speech capturing device and operative to: (i) convert the spoken utterance input by the user to text; (ii) associate in a database the barcode read from the item with at least one of the spoken utterance input from the user and the corresponding text; and (iii) search the database for at least one of the spoken utterance and the corresponding text when the barcode associated with the spoken utterance is subsequently read by the barcode reader; and
a speech outputting device, the speech outputting device being operatively coupled to the processing means and operative to output the spoken utterance found during the search;

wherein the speech-to-text conversion is performed on a computing device remotely located with respect to a computing system performing the other steps, and further wherein the computing device that performs the speech-to-text conversion archives electronically-readable identifiers and associated text-converted spoken utterances on a removable storage medium such that an archived mapping is created over time between items having electronically-readable identifiers and text-converted spoken utterances that are representative of user descriptions of the items wherein the archived mapping is specific to the user and is removably-portable and represents items that the user may interact with at a future time or place, and further wherein the spoken utterance input by the user is transmitted to the remotely-located computing device prior to speech-to-text conversion.

16. The apparatus of claim 15, wherein, when the barcode input from the item is associated with the corresponding text, the processing means is further operative to convert the text back to speech when the barcode is subsequently read such that the converted speech is output by the speech outputting device.

17. The apparatus of claim 15, wherein the apparatus is configured to be user-portable.

18. An article of manufacture for using speech for marking and subsequently identifying one or more items having electronically-readable identifiers respectively marked thereon, comprising a machine readable medium containing one or more programs which when executed implement the steps of:
inputting at least a portion of the electronically-readable identifier marked on an item;
inputting from a user a spoken utterance that corresponds to the item;
converting the spoken utterance input by the user to text;
associating the electronically-readable identifier input from the item with at least one of the spoken utterance input from the user and the corresponding text; and
outputting the spoken utterance when the electronically-readable identifier associated with the spoken utterance is subsequently inputted;
wherein the speech-to-text conversion is performed on a computing device remotely located with respect to a computing system performing the other steps, and further wherein the computing device that performs the speech-to-text conversion archives electronically-readable identifiers and associated text-converted spoken utterances on a removable storage medium such that an archived mapping is created over time between items having electronically-readable identifiers and text-converted spoken utterances that are representative of user descriptions of the items wherein the archived mapping is specific to the user and is removably-portable and represents items that the user may interact with at a future time or place, and further wherein the spoken utterance input by the user is transmitted to the remotely-located computing device prior to speech-to-text conversion.

* * * * *